United States Patent [19]

Payne

[11] Patent Number: 5,560,701
[45] Date of Patent: Oct. 1, 1996

[54] VEHICLE ROOF TOP LAMPS

[75] Inventor: Phillip E. Payne, Northville, Mich.

[73] Assignee: Chrysler Corporation, Auburn Hills, Mich.

[21] Appl. No.: 399,159

[22] Filed: Mar. 2, 1995

[51] Int. Cl.⁶ .................................................. B60Q 1/28
[52] U.S. Cl. .............................. 362/80; 362/74; 362/83.3
[58] Field of Search ................................... 362/74, 80, 81, 362/82, 83, 83.3, 226, 235, 249, 223, 311

[56] References Cited

U.S. PATENT DOCUMENTS

| 3,005,089 | 10/1961 | Robbins | 362/80 |
|---|---|---|---|
| 3,187,172 | 6/1965 | Knapp et al. | 362/226 |
| 3,656,105 | 4/1972 | Steltzer et al. | 362/80 |
| 3,735,115 | 5/1973 | Adler, Jr. | 362/265 |
| 4,079,442 | 3/1978 | Tuerck | 362/80 |
| 4,652,036 | 3/1987 | Okamoto et al. | |
| 4,707,014 | 11/1987 | Rich | |
| 4,953,065 | 8/1990 | Kao | 362/80 |

FOREIGN PATENT DOCUMENTS

| 735312 | 5/1966 | Canada | 362/80 |
|---|---|---|---|
| 2227828 | 8/1990 | United Kingdom | 362/223 |

Primary Examiner—Denise L. Gromada
Assistant Examiner—Y. Quach
Attorney, Agent, or Firm—Mark P. Calcaterra

[57] ABSTRACT

The present invention relates to a vehicle roof top lamp in the form of an automotive vehicle roof spoiler wherein one or more lights are encapsulated within the body of a translucent aerodynamic housing. The preferred embodiment includes a housing having a base portion and a cover portion which are mated to conceal one or more lamps therein such that upon activation of the lamp means the spoiler becomes illuminated.

7 Claims, 3 Drawing Sheets

VEHICLE ROOF TOP LAMPS

BACKGROUND OF THE INVENTION

Roof mountable lamps attached during production or as an after market component have been utilized on automotive vehicles and, more particularly, in association with trucks to light the way for both off and on road use for a number of years. Such roof mountable lamps tend to provide high intensity illumination especially during use off road or on rural unpaved roads which often develop large pot holes and the like. Of the known roof mountable lamps, the lamp members typically extend above the roof surface thereby making them susceptible to breakage by stones and other debris often encountered while driving the vehicle.

For example, trucks often are seen to include a plurality of spaced apart lamps disposed along the leading edge of the roof. However, these spaced apart lamps which are generally akin to modified halogen head lights, are somewhat susceptible to breakage. While it is desirable and often required by state and federal regulatory agencies that a multiplicity of spaced apart lamps be employed, this requirement merely enhances the likelihood that one or more lamps will be broken over time. Thus, there appears to be a need for roof mountable lamps which serve their intended purposes and yet, are protected against breakage by stones and other debris.

Additionally, automotive vehicle spoilers attached during production or as an after market component on vehicles have been utilized for a number of years. Of these spoilers, many have been developed for numerous areas along the automotive vehicle body including, for example, along the roof at both the forward and rearward ends. Generally, spoilers utilized at the forward end of roofs are typically designed to reduce drag caused by air friction against the vehicle surface as the vehicle moves forwardly, while spoilers utilized at the rearward end of a roof serve to prevent dirt from forming on the rear window.

With particular regard to vehicle roof spoilers disposed along the forward end of the roof, the spoilers are typically intended to create a situation known as "lift" which results from the aerodynamic shape of the spoiler. Typically, as the vehicle is moving forwardly the leading edge of the spoiler cuts into the air and an upwardly inclined top surface directs the air passing thereover in a generally parallel manner over the roof surface. This is believed to reduce drag on the vehicle.

In view of the foregoing, it is submitted that vehicle roof top lamps which incorporate the advantages of an aerodynamic roof spoiler and which are further capable of housing one or more lights, thus protecting them from flying debris, would be highly desirable.

SUMMARY OF THE INVENTION

The vehicle roof top lamps of the present invention include at least one and under certain embodiments a plurality of lights disposed within a single elongated housing to illuminate a specific area of the vehicle. While the present invention is described with particular reference to an embodiment attached to the vehicle roof, it is contemplated that the lamp assembly of the present invention could alternatively be disposed on other vehicle panels as well. Ideally, the housing is in the form of an automotive roof spoiler having an aerodynamic shape formed from a durable plastic material. Ideally, the plastic material utilized will have certain translucent properties, thereby allowing light to be transmitted therethrough. Typically, the housing includes a forward leading edge which comes to a point and includes an inclined top surface extending upwardly from the leading edge to reduce drag. The housing which contains the one or more lights can be opened to access the one or more lights employed in the event that any of the lights need replacement.

According to a first embodiment of the present invention, the housing includes a cover portion and a separate base member, with the cover portion being snap fit over the base member to provide the aerodynamic spoiler configuration. Under an alternative embodiment, the vehicle roof top lamp of the present invention includes a housing having a cover portion and base portion integrally attached along one edge of the base member via a plastic hinge wherein the cover can be snapped along a second edge of the base member to close the housing.

With regard to the lighting assembly contained within the housing, under one embodiment a total of five spaced apart lights are provided to comply with state and federal regulations relating to the use of vehicle roof top lamps. The lights are typically mounted to upwardly extending tabs provided proximate the rear edge of the base member for optimum light transmission. The lights can be wired through the roof of the vehicle and ultimately connected to the vehicle. Thus, the operator can activate the lights from within the cab or passenger compartment.

The vehicle roof top lamps of the present invention provide numerous advantages such as high intensity illumination of areas along and around the automotive vehicle. Additionally, the vehicle roof top lamps of the present invention include a high strength housing for protecting the one or more lights from breakage due to contact by debris. The vehicle roof top lamps can be tied into the vehicle's existing electrical system and activated by flipping a switch contained within the passenger compartment of the vehicle as is known with current commercially available roof top lamp assemblies or can be provided with a self-contained power supply separate and distinct from the vehicle's electrical system. Ideally, the housing which contains the lights is in the form of a spoiler offering the aerodynamic effects of reduced frictional drag and lift, as well as a reduction in the amount of dirt accumulated over the roof of the vehicle.

Various other objects and advantages of the present invention should become apparent to those skilled in the art upon review of the following description of the preferred embodiments, the appended claims, and the accompanying drawings.

DETAILED DESCRIPTION OF THE PREFERRED EMBODIMENT

Figure 1:
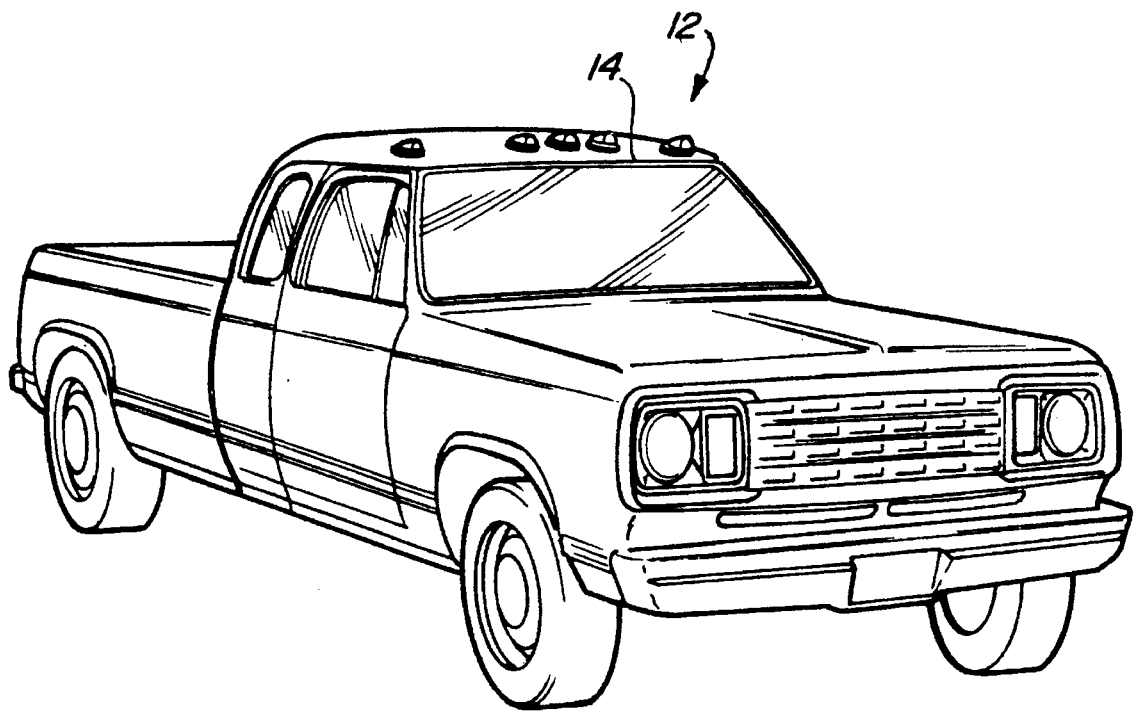
FIG. 1 is a perspective view of a truck including a prior art roof top lamp assembly.

Referring to FIG. 1, there is shown a conventional vehicle such as a pickup truck 12, having a plurality of vehicle roof top lamps spaced apart along the leading edge 14 as known in the art. Under such prior art assemblies, each lamp is essentially akin to a modified halogen head lamp, thus offering little protection to the lamp housing and the light contained within the lamp housing.

Figure 2:
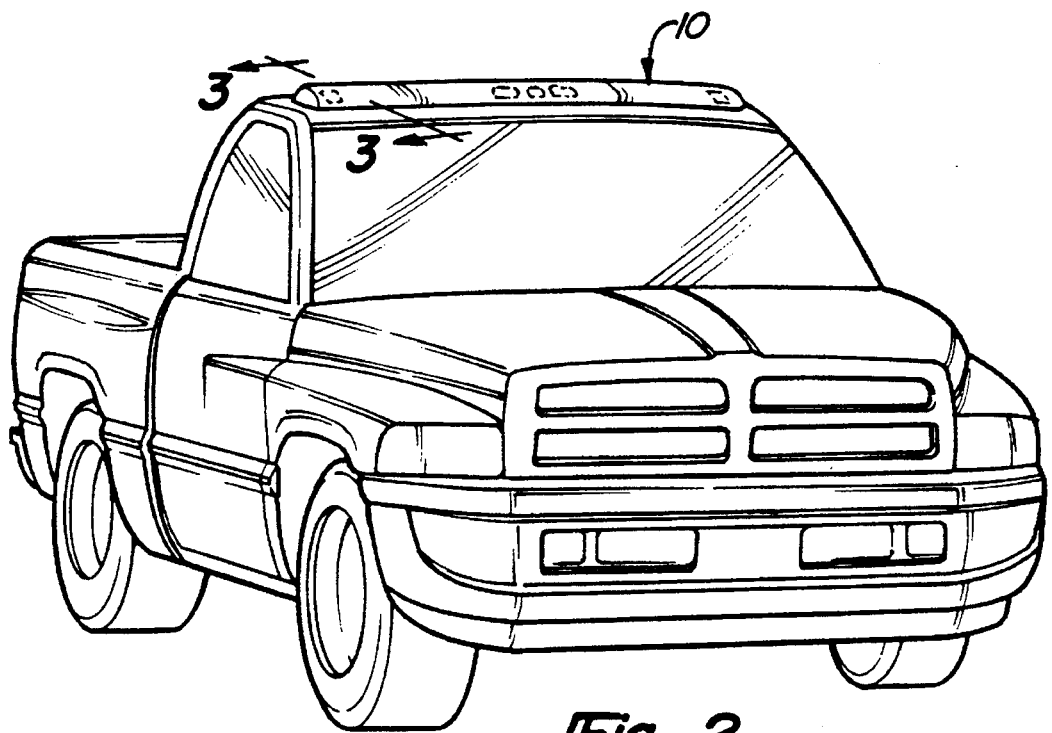
FIG. 2 is a perspective view of a vehicle roof top lamp assembly according to the teachings of the present invention.
Figure 3:
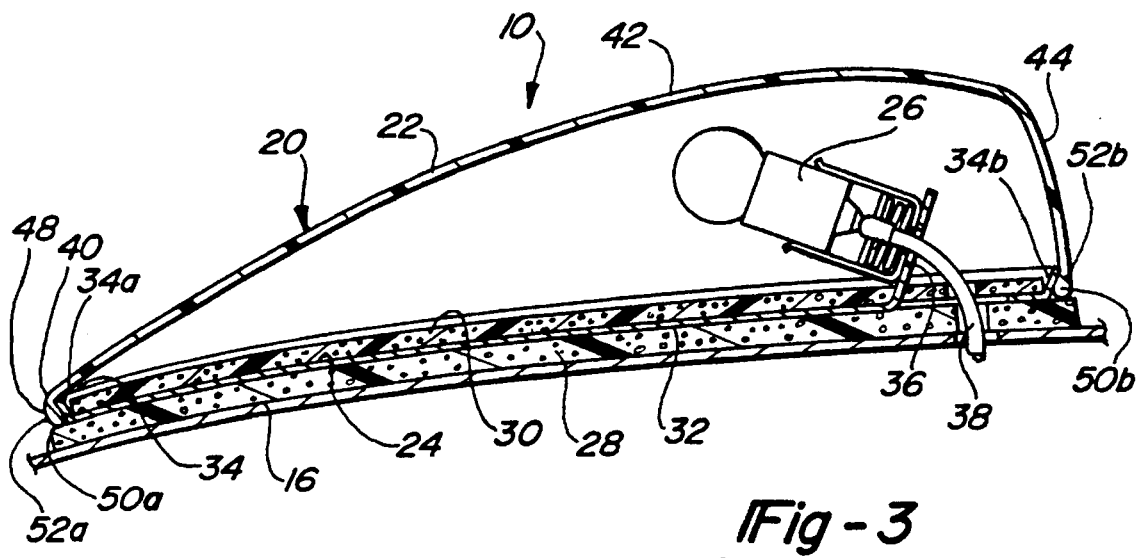
FIG. 3 is a sectional view of the vehicle roof top lamp assembly shown in FIG. 2 taken along line 3—3 thereof.

Referring to FIGS. 2 and 3, a vehicle roof top lamp assembly 10 according to the teachings of the present invention is provided. As shown particularly in FIG. 3, the vehicle roof top lamp assembly 10 includes a housing 20 which includes a cover portion 22 and a separate base portion 24 which is mounted to the roof of the vehicle. Disposed within the housing 20 are a plurality of lights 26 which extend above to the base portion 24. Optionally, but preferably, a first protective layer 28 is disposed between the base portion 24 and the vehicle roof 16 to protect the vehicle roof from abrasion by the lamp assembly 10. Additionally, a second protective layer 30 can optionally be provided over the bottom wall 32 of the base portion 24 within the housing to insulate the interior of the vehicle roof lamp assembly. While any one of a number of differing materials can be used to form the protective layers, it is preferred that the material utilized for the first layer 28 be durable and the material of the second layer 30 be fire retardant.

Referring to FIG. 3, a sectional view of the vehicle roof top lamp assembly is provided. The base portion 24 is generally an elongated substantially rectangular shaped member having a radially outwardly extending upper peripheral edge 34 and a bottom wall 32 which is mounted to the roof of the vehicle through the use of adhesive mechanical fasteners. The outwardly extending peripheral edge 34 assists in maintaining the housing in a snap-fit relationship.

At predetermined intervals the bottom wall 32 of the base portion 24 includes upwardly extending substantially rigid tab portions 36 which serve as an anchor for mounting the lights 26 as shown. Thus, the base portion 24 will preferably be made from a stamped metal base having the tab portions punched out or be formed from a molded plastic which is provided with tab portions upon formation.

The lights 26 can come in a variety of forms including halogen lights, neon lights, or virtually any incandescent light which can be activated by an electrical charge. As previously noted, the lights 26 can be activated from within the passenger cab of the vehicle and energized by tying lead wires 38 into the existing electrical system of the vehicle or, alternatively, can be energized by an independent power source such as a self-contained battery.

With regard to the housing of the roof top lamp assembly, the housing 20, and more particularly, the cover portion 22 of the housing generally includes an inclined top surface 42 extending upwardly from the leading edge portion 40 and terminating in a downwardly diverging back wall 44, thus providing the housing with an aerodynamic shape. Preferably, the cover portion is made from a lightweight durable plastic material having excellent luminescent properties which allow the lights contained within the lamp assembly to transmit lightwaves therethrough. The plastic material may be colorized as is known in the plastics industry so long as the colorization does not seriously effect the translucent nature of the plastic. For example, it may desirable to utilize an amber colored plastic to form the cover portion to comply with certain requirements set forth by state and federal regulatory agencies regarding the use of vehicle roof top lamps.

Additionally, the cover portion 22 as shown in FIG. 2, includes means 48 for attaching the cover portion over the base portion 24. The means 48 generally include inwardly extending flanges 50A and 50B disposed along the terminal lateral edges 52A and 52B thereof which engage the lateral peripheral edges 34A and 34B of the base portion 24 in a snap fit relationship.

Figure 4:
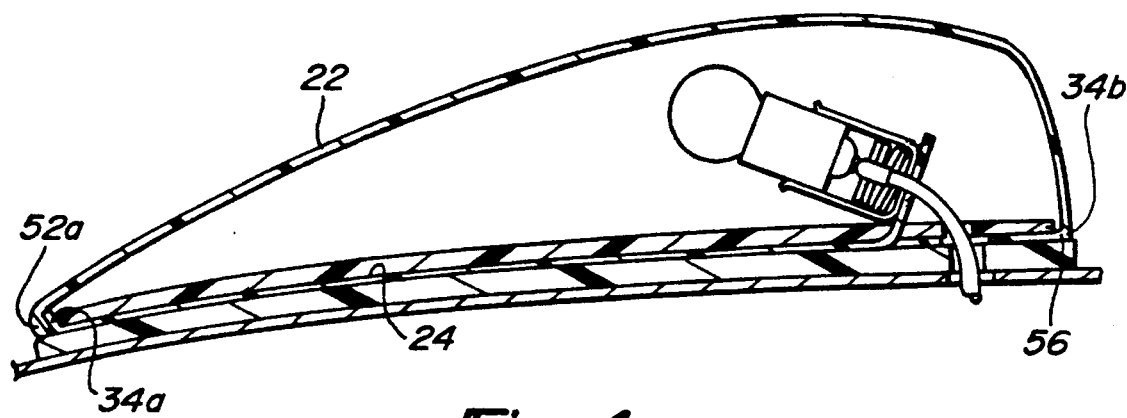
FIG. 4 is a sectional view of an alternative vehicle roof top lamp assembly.

Referring to FIG. 4, there is shown an alternative vehicle roof lamp assembly in accordance with the teachings of the present invention. Since, the embodiment illustrated with regard to FIG. 4, the same in most respects as the one illustrated with regard to FIGS. 2 and 3, it should be noted that like reference numerals will be utilized for like features. The base portion 24 and cover portion 22 of FIG. 4 are integrally connected as a single one-piece plastic structure along the laterally extending edge 34B generally positioned at the rear portion of the lamp assembly. The cover portion 22 is capable of being pivoted to both open and closed positions along a plastic hinge 56 (often referred to in the plastic forming technology industry as a "living hinge") provided at the laterally extending edge 34B. Again, upon closure of the cover portion 22 the terminal lateral edge 52A snaps over the lateral edge 34A of the base portion 24 to contain the lights 26.

Figure 5:
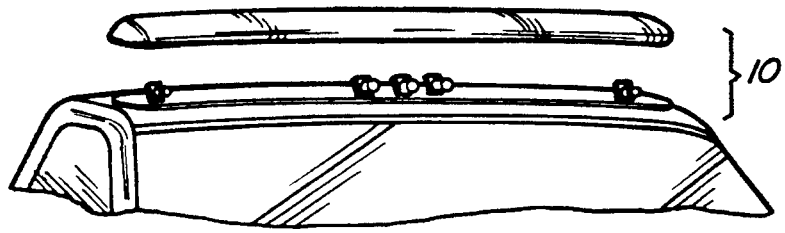
FIG. 5 is a front perspective view illustrating a vehicle roof top lamp assembly according to the teachings of the present invention including a spaced apart light configuration.
Figure 6:
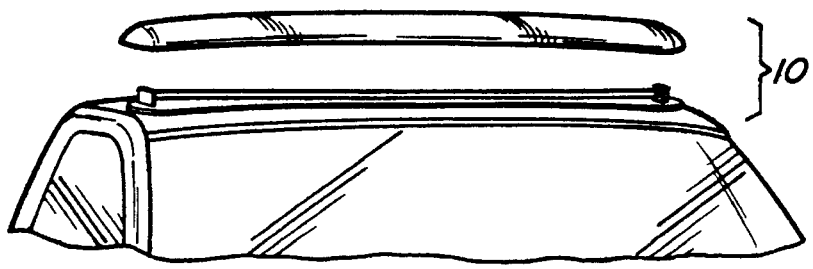
FIG. 6 is a front perspective view illustrating a vehicle roof top lamp assembly according to the teachings of the present invention including a single elongated fluorescent light configuration.

Referring to FIGS. 5 and 6, there are shown lamp assemblies 10 having alternative light structure embodiments. While it may generally be preferred to utilize a plurality of lights within the roof top lamp assembly of the present invention as shown in FIGS. 2, 3 and 5, it should be clearly understood that alternative light structures and arrangements are contemplated as shown in FIG. 6 under the teachings of the present invention.

While it will be apparent that the preferred embodiments of the invention disclosed are well calculated to provide the advantages and features above stated, it should be appreciated by those skilled in the art that the invention is susceptible to modification, variation, and change without departing from the proper scope and fair meaning of the subjoined claims.

What is claimed is:

1. A lamp assembly for attachment to a roof of an automotive vehicle, comprising:

an elongated housing including a translucent aerodynamically shaped plastic cover portion defined by a forward leading edge, an inclined top surface extending upwardly from said forward leading edge and a downwardly diverging back wall extending downwardly from said top surface, said plastic cover portion being selectively engaging to a base portion, each of said plastic cover portion and said base portion having a length substantially equal to a lateral diameter of an automotive vehicle roof;

light means disposed within said housing between said plastic cover portion and said base portion;

wherein said elongated housing is configured to be mounted to said roof of said automotive vehicle such that said forward leading edge of said plastic cover portion extends substantially across said roof in a lateral direction of said automotive vehicle.

2. The lamp assembly of claim 1, wherein said plastic cover portion and said base portion are in a form of a unitary structure which is integrally attached along one edge by a plastic hinge.

3. The lamp assembly of claim 1, wherein said light means includes a plurality of separate and distinct lights disposed within said housing between said plastic cover portion and said base portion.

4. The lamp assembly of claim 1, wherein said light means include a single elongated light disposed within said housing between said plastic cover portion and said base portion.

5. The lamp assembly of claim 1, further comprising a protective layer disposed between an exterior surface of the vehicle and said base portion.

6. The lamp assembly of claim 1, further comprising an insulation layer disposed within said housing along said base portion.

7. The lamp assembly of claim 1, wherein said leading edge of said plastic cover portion includes an inwardly extending flange and said base portion includes at least one upwardly and outwardly extending wall selectively engaging to said inwardly extending flange to secure said plastic cover portion over said base portion.

* * * * *